Patented Apr. 7, 1931

1,799,277

UNITED STATES PATENT OFFICE

WALTER O. BORCHERDT, OF AUSTINVILLE, VIRGINIA, ASSIGNOR TO THE NEW JERSEY ZINC COMPANY, OF NEW YORK, N. Y., A CORPORATION OF NEW JERSEY

DEFLOCCULATION OF COLLOIDS

No Drawing.    Application filed April 1, 1925.  Serial No. 20,011.

This invention relates to the art of effecting the suspension of finely divided solids in a liquid and more particularly to the deflocculation of colloidal matter. The invention has for its object the provision of certain improvements for promoting the suspension of finely divided solids in a liquid medium or for promoting the deflocculation of colloidal matter.

Throughout this specification and the appended claims, I intend to embrace in the expressions "colloids", "colloidal matter" and "colloidal constituents" both true colloids and quasi or borderland substances which may not be truly colloidal but partake of the qualities of, or resemble, colloids, and without regard to the sources from which such colloidal matters are derived. Thus, for the purposes of the present invention, the colloidal constituents may be considered as ranging from just above the molecular size upward through the class of so-called suspensoids, which, while possibly not true colloids, still, because of their relatively large specific surface, exhibit some, if not all, of the properties of colloids, and are capable of existing in both the sol or gel state, or of being dispersed and coagulated or flocculated and deflocculated. By colloidal matter, therefore, I mean material which is not necessarily a true colloid, but which exhibits colloidal characteristics to a sufficient degree to make it amendable to the manipulation hereinafter described.

In the ore-dressing, clay-working, chemical and allied industries, materials are customarily treated which consist of mixtures of more or less finedly divided solid particles with a liquid medium, commonly water, to form pastes or pulps. Such mixtures of finely divided solid particles and liquid usually contain colloidal matters and it is often essential to control the amount or condition, or both, of such colloidal constituents. In some cases, the problem presented is that of the removal to a desired degree of the colloidal from the non-colloidal or granular constituents. In other cases, it is required to change the state in which the colloidal constituents exist, in order thereby to secure a desired alteration in the properties of the mixture.

The colloidal constituents of such mixtures of finely divided solid particles with a liquid are rarely, if ever, naturally deflocculated and dispersed to their maximum possible extent. Since aggregated or flocculated colloidal matters act in some cases like solid particles of greater magnitude and in other cases display characteristics different from those which they possess when completely dispersed or deflocculated, it is often necessary, in order to effect either the removal of such colloidal constituents from the mixture or the desired alteration in the properties of the mixture, to bring about the more or less complete deflocculation or dispersion of such colloidal constituents.

The agencies which promote the flocculation of the colloidal constituents also in general seem to promote the adsorption or other form of attachment which exists between such colloidal constituents and the granular constituents of the mixture. It follows, therefore, that when the colloidal constituents have been thoroughly deflocculated and minutely dispersed, they no longer exist in the form of aggregates resembling the coarser solid particles of the mixture but behave more like substances in solution and are in fact spoken of as being in colloidal solution, and as, at the same time, their adsorption or other bond for the coarser solid particles may have been weakened, the removal of such colloidal constituents from the mixture is greatly facilitated over what is possible in their natural partially flocculated condition; or their change in condition alters the properties of the mixture.

Even when the colloidal constituents of a mixture are originally deflocculated or have been deflocculated in a previous treatment step, they may have become flocculated during the subsequent treatment, or agents may have been added which cause them to flocculate, and in such cases, the same general method of treatment is applied to secure deflocculation in accordance with the principles of this invention as would be applied to a mixture containing naturally flocculated colloidal constituents.

Since the principles of the present invention are applicable to the treatment of many kinds of mixtures of finely divided particulate matter with a liquid to form a paste or pulp, I wish to be understood when referred to "pulps" or "pastes" as including in these terms mixtures of natural or artificial particulate matters with a liquid, and, therefore, comprehending ores, tailings, middlings, smeltery slags, flue dusts, fumes, furnace products, manufactured materials, foundry or factory sweepings or similar débris, coal, coke, clay, sand, gravel, concrete aggregate, rock crushed for agricultural purposes or for fertilizer manufacture, oil-shale, oil-rock, oil-sand, etc., when mixed with a liquid to form a paste or pulp.

The word "mineral," as herein used, is to be understood as including inorganic substances of substantially constant chemical composition occurring naturally in the crust of the earth; such inorganic but artificial substances analogous in structure and use to natural minerals, and which, by extension of thought are in practice classed as minerals, and also such substances found in the earth as are organic in the sense that they are supposed to owe their origin to the plant or animal life of past geological ages, but are now classed as minerals. It will therefore be understood that I intend to include in the word "mineral" not only the well recognized natural minerals, metallic and non-metallic, but also metals, elements, smeltery slags, refractory materials, abrasive substances, glass, ashes, flue-dusts, foundry or factory sweepings or similar débris, coal, coke, clay, bitumens, petroleum oils, etc.

Treatments having for their purpose the change of condition of the colloidal constituents of a mixture in order to alter or modify the properties of the mixture and not necessarily involving removal of colloidal constituents therefrom are frequently employed. Such treatments may be applied to pastes containing so little liquid as to be semi-solid or to mixtures containing so large a proportion of liquid as to be fluid or semi-fluid, in which condition they are generally spoken of as pulps. Thus, a mixture of clay with water may contain flocculated colloidal constituents and with a given water content may approximate a semi-solid and by the addition of the deflocculating agent of the present invention and the kneading, pugging, or blunging treatment commonly applied, a higher degree of fluidity may be secured without increase of the water content of the mixture. Such operations are commonly involved in the preparation of clays for brick-making, casting, and similar purposes, as will be well understood by those skilled in the arts to which this invention relates.

For the purposes of explanation, the present invention will be particularly described as applied to the concentration of minerals, and the understanding of the invention derived from this description will enable those skilled in the art successfully to apply the principles of the invention to other mineral treatment operations.

I have discovered that the various forms of sulfite waste liquor are effective agents for promoting the suspension of finely divided solids in a liquid medium or for promoting the deflocculation of colloidal constituents in pastes or pulps. The present invention accordingly contemplates the treatment of mixtures of finely divided solids and a liquid medium with an appropriate form of sulfite waste liquor for promoting the suspension of finely divided solids in the liquid medium or for deflocculating colloidal constituents in the mixture. As applied to the removal of colloidal matter from a pulp containing the same, the invention contemplates treating the pulp with an appropriate form of sulfite waste liquor, preferably in conjunction with agitation, and thereby deflocculating the colloidal matter to a desired extent, and then removing the deflocculated colloidal matter to a desired extent from the pulp, preferably by decantation.

"Sulfite waste liquor" is also called "sulfite pulp waste," "sulfite pulp waste liquor" and "sulfite waste". In the process of the manufacture of wood pulp from spruce or other coniferous woods an acid extract is produced in the digestion of the chips. The digestion liquor may be a solution of sodium bisulfite or it may be a solution of calcium bisulfite or of magnesium bisulfite or more generally a mixture of the two latter and it contains also generally free sulfurous acid or sulfur dioxide ($SO_2$) as well as a small amount of sulfuric acid and other minor constituents depending upon the process which is used. The digestion liquor is ordinarily applied to the wood chips under pressure in large closed tanks or digesters in the presence of heat and agitation and is allowed to act until the natural wood, acids, waxes, lignin, etc. have been removed from the cellulose of the wood chips. Upon completion of the digestion process the mass is washed with water and it is this "acid" extract which is known as "sulfite waste liquor."

As produced, this sulfite waste liquor is a complex solution and suspension of organic and inorganic substances of variable and party uncertain chemical composition. It is known that sulfite waste liquor generally contains a small amount of free sulfuric acid, various sulfates and other salts, sugars, gums, esters, etc.

Not only is the chemical composition of sulfite waste liquor variable and uncertain, but, as delivered from the digesters, the density and other physical properties of the liquor vary quite widely as between different mills employing different woods, processes and details of manufacturing methods. Because of the impracticability of shipping the dilute form of sulfite waste liquor long distances because of excessive freight charges, the material is more commonly marketed in a concentrated form. Concentration is generally effected by evaporation under reduced pressure and serves to produce liquors or solids of more uniform physical and chemical characteristics.

Some of the substances occurring in concentrated sulfite waste liquor are colloidal in character and it is probable that the properties of the material which determine its value in the process of the present invention result, in part, at least, from the colloidal character of some of the constituents.

As has been mentioned, concentrated sulfite waste liquor is available both in the form of a liquid and of a solid, the latter being the completely desiccated form of the former. Of the many forms of concentrated sulfite waste liquor commercially available, I will describe those ordinarily marketed by the Robeson Process Company.

Standard

This material is sulfite waste liquor which has been neutralized by milk of lime and the neutralized material subjected to evaporation in a vacuum in a quadruple effect evaporator, the product of the fourth evaporation being called "standard sulfite liquor" or "glutrin". This material is a dark thick liquid, neutral to litmus, easily soluble in water and it has a specific gravity of about 1.25.

Standard tanning

The previous product when made acid with sulfuric acid to precipitate the lime and then filtered produces a liquor known as "standard tanning". It is a thick dark red liquid with a very offensive odor, is acid to litmus and is easily soluble in water.

Neutralized spruce

When the preceding material is neutralized with soda ash or some equivalent material, the resulting liquor is called "neutralized spruce". It is a thick black liquor with a specific gravity of about 1.31 and is easily soluble in water.

Plump tan X

This is a recently developed form of concentrated sulfite waste liquor which has been especially produced for the tanning trade. It is dark red, acid to litmus, has a specific gravity of about 1.246 and is easily soluble in water.

All of these concentrated sulfite waste liquors as manufactured by the Robeson Process Company have given satisfactory results when used in the practice of the process of the present invention in appropriate quantities and under suitable conditions, both of which will be hereinafter more fully described. Similarly other forms of concentrated sulfite waste liquor such as "Muskegon Extract No. 30", made by the Muskegon Extract Company, and "Binderene", made by the International Paper Company, have likewise proved suitable for the practice of the present invention.

In carrying out the present invention in connection with the treatment of pulps and more particularly mineral pulps, the sulfite waste liquor is added to the pulp and distributed throughout the mass thereof. The desired distribution of the sulfite waste liquor through the pulp, and the deflocculation of colloidal matter in the pulp, is promoted by rapid circulation and agitation of the pulp. Increase or decrease in temperature may also be of assistance in promoting the desired action of the sulfite waste liquor.

The necessary distribution of the sulfite waste liquor through the mass of the pulp can be very conveniently and effectively brought about by adding the sulfite waste liquor to the pulp at some point prior to the admission of the pulp to the ball or pebble mills, or other fine grinding machines which almost invariably form a part of the equipment of mineral treatment plants.

Where the pulp contains, in solution in the liquid thereof, substances which prevent dispersion or deflocculation of the colloids by sulfite waste liquor, such substances may be in part or in whole removed, as for example, by the removal of the liquid from the pulp, and repulping with non-deleterious fresh liquid, prior to the introduction of the sulfite waste liquor, or such substances may be otherwise neutralized and rendered harmless by methods and agents which are generally known, and can be regulated by simple tests. For example, an excessive quantity of magnesium sulfate or of some other electrolyte in a mineral pulp may interfere with the proper action of sulfite waste liquor as a deflocculating agent. Such a condition may be corrected by washing the mineral for the removal of soluble salts.

When the colloidal matter in the pulp has been deflocculated to the desired extent, the deflocculated colloidal matter may be removed (by decantation or otherwise) from the pulp to the extent necessary to prevent the colloids from interfering with the subsequent treatment of the pulp, or to the extent desired for any other purpose. Such removal of the colloids in a deflocculated condition may take place in tanks such as those of the Dorr, Allen or Callow types. With the overflow from such tanks there will be removed a corresponding amount of liquid and the remaining pulp will be correspondingly thickened.

After the deflocculated colloidal matter has been removed to the desired extent (that is in whole or in part, depending upon the result desired), the remaining mineral pulp may be subjected to any appropriate treatment operation. To this end, the pulp may be further thickened or dried, or it may be diluted, depending upon the nature of the subsequent treatment operation.

Where the residual sulfite waste liquor in the remaining pulp is deleterious in a subsequent treatment operation, it may be removed, as by repulping with fresh liquid and effecting a second decantation, or by otherwise washing the pulp with fresh liquid to remove objectionable amounts of the sulfite waste liquor.

The colloidal matter separated from the pulp is commonly of a character such that it may be discarded. In case the colloidal matter is of value, it may, of course, be recovered from the accompanying liquid. The liquid accompanying the removed colloids may be separated and recovered for reuse. The colloids contained therein may thus be coagulated and settled or filtered out. The liquid thus separated from the colloids may be purified, if necessary, to free it from substances prejudicial to its subsequent reuse.

The amount of the waste sulfite liquor to be used in practicing the present invention depends upon its form (that is, its degree of concentration and other physical properties and upon its chemical composition), the nature of the pulp under treatment, the degree or character of deflocculation to be attained, the temperature, the degree of dilution of the pulp and the kind and the relative amount of colloidal matter in the pulp. Of the concentrated sulfite waste liquors hereinbefore particularly mentioned, from 1 to 50 pounds per ton of dry solids in the pulp may be required.

As some of the sulfite waste liquors are acid, others neutral or alkaline, I have found that by tests a suitable combination of sulfite waste liquor and mineral pulp can generally be found which will permit of securing the desired result with a much smaller quantity of sulfite waste liquor per ton of dry material treated than is indicated by the larger figure just mentioned. Thus, in treating a certain ore, I found that with Robeson "standard tanning", 8 pounds of the sulfite waste liquor was required per ton of dry ore to produce a deflocculation of a certain degree regardless of whether or not the ore pulp had been treated with agents for the precipitation of some of the soluble salts which it contained, but with Robeson "plump tan X", I found that 8 pounds of the sulfite waste liquor was required per ton of dry ore when the ore pulp had not been treated and only 5 pounds per ton of dry ore was required when the ore pulp had been treated with lime and sodium carbonate to precipitate certain salts which it contained in solution. I have found other ores, especially one which had been partly roasted, which contained, when made into a pulp with water, so large a proportion of soluble salts that 50 pounds of Robeson "standard tanning" was required per ton of ore to secure even a poor deflocculation; but that the same ore after having been washed with 5 weights of water to remove these soluble salts gave with the same brand of sulfite waste liquor an excellent deflocculation when used at the rate of 10 pounds per ton of ore.

In general I have observed that the sulfite waste liquors when properly selected to suit a particular ore are less sensitive to the action of electrolytes than is sodium silicate. It should also be observed that the quantities of sulfite waste liquor given in the particular examples just mentioned apply to laboratory tests in which the value of the agent is measured in terms of a standard (arbitrarily chosen) degree of deflocculation for the colloids in that ore and that in practice in dealing with the ore in the mill, it is generally sufficient to use much smaller quantities, as, for example, from 1 to 5 pounds of sulfite waste liquor per ton of ore. The reason for this is that in practicing deflocculation and decantation in a mill, the rate of treatment is adjusted to give certain economically satisfactory results without regard to whether these are the optimum which might be obtainable.

I claim:

1. The improvement in promoting the deflocculation of finely divided solids in a liquid medium which comprises treating without added heat a mixture of the finely divided solids and the liquid medium with prepared sulfite waste liquor.

2. The improvement in promoting the deflocculation of finely divided solids in a liquid medium which comprises blunging a mixture of the finely divided solids and the liquid medium in the presence of sulfite waste liquor.

3. The improvement in the deflocculating colloidal matter which comprises treating without added heat a pulp containing the colloidal matter with prepared sulfite waste liquor.

4. The method of removing colloidal matter from a pulp containing the same which comprises treating without added heat the pulp with prepared sulfite waste liquor and thereby deflocculating the colloidal matter to a desired extent, and removing the deflocculated colloidal matter to a desired extent from the pulp.

5. The method of deflocculating and removing colloidal matter from a mineral pulp containing the same which comprises treating without added heat the mineral pulp with prepared sulfite waste liquor and thereby deflocculating the colloidal matter to a desired extent, and separating the deflocculated colloidal matter from the mineral pulp by decantation.

6. The improvement in deflocculating colloidal matter which comprises subjecting without added heat a pulp containing the colloidal matter to agitation in the presence of prepared sulfite waste liquor.

7. The method of deflocculating and removing colloidal matter from a mineral pulp containing the same which comprises agitating without added heat the mineral pulp in a suitable electrolyte, weakening the adsorption bond between the mineral particles by means of a prepared sulfite waste liquor, thereby deflocculating the colloidal matter to a desired extent and removing the deflocculated colloidal matter to a desired extent from the pulp.

8. The method of deflocculating and removing colloidal matter from a mineral pulp containing the same which comprises agitating the mineral pulp in a prepared electrolyte, weakening the adsorption bond between the mineral particles by means of concentrated sulfite waste liquor, thereby deflocculating the colloidal matter to a desired extent and removing the deflocculated colloidal matter to a desired extent from the pulp.

9. The method of deflocculating and removing colloidal matter from a mineral pulp containing the same which comprises agitating the mineral pulp in a prepared electrolyte, weakening the adsorption bond between the mineral particles by means of ionized sulfite waste liquor, thereby deflocculating the colloidal matter to a desired extent and removing the deflocculated colloidal matter to a desired extent from the pulp.

10. The method of treating a body of pulp containing flocculated colloidal constituents in suspension which comprises treating the pulp to prepared waste sulfite liquor in amount adapted to deflocculate said colloidal constituents.

11. The method of treating a body of pulp containing flocculated colloidal constituents in suspension which comprises treating the pulp to prepared waste sulfite liquor in amount adapted to deflocculate said colloidal constituents, and separating the deflocculated colloidal matter from the pulp by decantation.

12. The method of treating mineral pulp containing colloidal matter in objectionable amount which comprises subjecting the mineral pulp to the action of prepared waste sulfite liquor in amount adapted to effect the dispersion of said colloidal matter, and removing the dispersed colloids from the pulp.

13. The method of treating finely crushed mineral bearing ore in the form of an aqueous pulp containing flocculated colloidal matter in objectionable amount which comprises subjecting the pulp to the action of prepared waste sulfite liquor in amount adapted to deflocculate said colloidal matter while leaving the mineral bearing particles substantially free of colloidal matter.

14. The method of treating finely crushed mineral bearing ore in the form of an aqueous pulp containing flocculated colloidal matter in objectionable amount which comprises agitating the pulp with prepared waste sulfite liquor in amount adapted to deflocculate said colloidal matter while leaving the mineral bearing particles substantially free of colloidal matter.

15. The method of treating finely crushed mineral bearing ore in the form of an aqueous pulp containing flocculated colloidal matter in objectionable amount which comprises agitating the pulp with prepared waste sulfite liquor in amount adapted to deflocculate said colloidal matter, decanting the deflocculated colloidal matter and leaving the mineral bearing particles substantially free of colloidal matter.

In testimony whereof I affix my signature.

WALTER O. BORCHERDT.